B. T. LOOMIS.
Revolver.
No. 52,582. Patented Feb. 13, 1866.
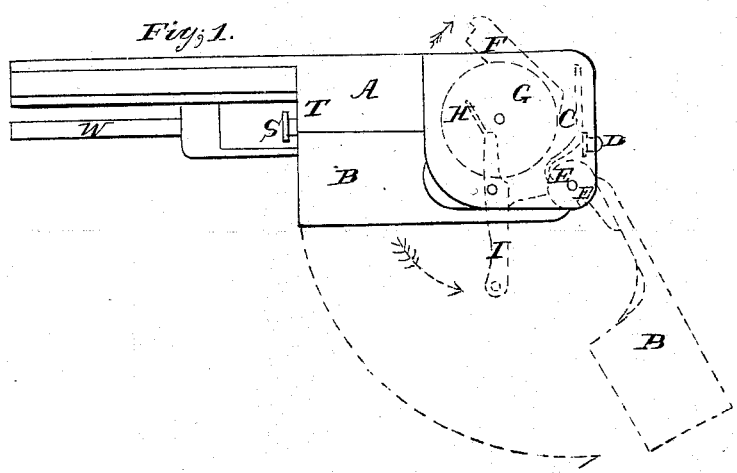
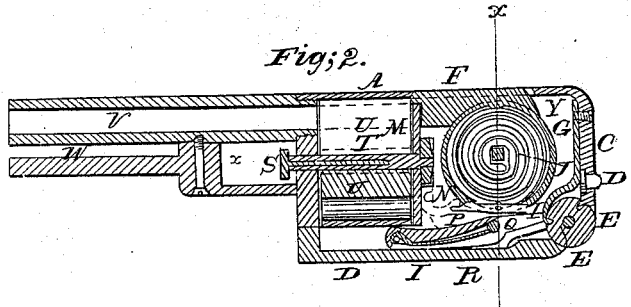
Witnesses;
S. J. Gordon.
Geo H Collins
Inventor;
Benj. T. Loomis

UNITED STATES PATENT OFFICE.

BENJAMIN T. LOOMIS, OF NEW YORK, N. Y.

IMPROVEMENT IN REVOLVING FIRE-ARMS.

Specification forming part of Letters Patent No. 52,582, dated February 13, 1866.

*To all whom it may concern:*

Be it known that I, BENJAMIN T. LOOMIS, of the city, county, and State of New York, have invented a new and Improved Breech-Loading Pistol; and I hereby declare that the following is a full, clear, and exact description thereof, reference being had to the accompanying drawings, making a part of this specification, and the letters of reference marked thereon, in which the same letter represents the same thing in each figure.

Figure 1 is an exterior view of my improved pistol with the stock open; Fig. 2, a longitudinal section through the same, the stock being shut; Fig. 3, a cross-section through the lock; Fig. 4, a cross-section of the slotted chamber-piece. Fig. 5 represents the under side of the hammer; Fig. 6, a side view of the hammer and trigger in position; Fig. 7, a rear view of the trigger and spring; Fig. 8, a view of the main or hammer pin in position. Fig. 9 represents the head of the hammer-pin; Fig. 10, a back view of the hammer-pin. Fig. 11 represents the trigger-pin, and Fig. 12 the ratchet-wheel and spring.

A is the stock; B, the swinging handle; C, the spring that secures it; D, the thumb-pin of spring C; E E, notches in the handle in which spring C catches; F, the hammer; G, the tumbler attached thereto; H, the dog on which trigger I operates to throw the hammer up; J, the mainspring; K, the spring to throw out dog H; L, the dog that turns ratchet-wheel M; N, the spring that holds dog L down; O, the locking-spring that holds ratchet-wheel M in place when the pistol is discharged; P, a cam on the tumbler to force out spring O while dog L turns ratchet-wheel M; Q, the trigger-pin; R, the trigger-spring; S, the slotted chamber-piece; T, the key thereof; *t t*, the cross-slots in the chamber-piece, in which key T slides; U, the slotted chamber-piece; V, the barrel; W, the shell-ejecting pin; X, the screw that holds it in place; Y, the hammer-pin; Z, the screw that holds it in place.

The object of my invention is to secure greater compactness and safety in revolving cylinder-pistols than has been obtained heretofore. This is done by making the under side of the stock to swing open and shut at pleasure, by having the trigger fold in with the movable stock, by having the hammer entirely incased in the stock, so that no part projects to be caught in transportation, and by so arranging the slotted chamber-piece that the hammer never rests on a loaded cartridge except at the instant of discharge and the movement of the chamber-piece ratchet-wheel, so that the chamber-piece does not begin to revolve until after the hammer is nearly at full-cock, whereby there is less likelihood of the accidental discharge of the pistol from careless touching of the trigger when the case is open. These results are, in a great measure, due to the circular mainspring incased in the hammer. The slotted chamber-piece has also great advantages from the facility of removal for loading.

The peculiarities of the operation of this pistol may be thus stated: Press thumb-pin D, and swinging part B of stock A may be drawn down until spring C catches in upper notch, E, which will hold it so firmly that the pistol may be held by handle B and discharged. As handle B is drawn down trigger I follows by the action of spring R. One side of trigger-pin Q is cut flat, so that spring R, resting thereon, operates also after the discharge to carry the trigger back to place, drawing key T, chamber-piece U, having its slot up, is free to be withdrawn, charged, replaced, and secured. Drawing upon trigger I, its upper end presses upon dog H, thereby raising hammer F. Cam P throws out spring O, so that dog L turns ratchet-wheel M, which starts the chamber-piece, in whose slot the hammer rested, and brings a cartridge in position when the hammer is fully up. One end of circular mainspring J is attached to stationary hammer-pin Y, the other to hammer F.

After loading, swinging case B may be shut. Spring C, catching in lower notch, E, will secure it. Trigger and hammer are now protected, and the discharge of the pistol is impossible. Hammer F rests safely against each discharged cartridge in turn as it rests in the slot after loading.

What I claim, and desire to secure by Letters Patent, is—

1. In combination with a part of a pistol-stock attached to the barrel and containing a lock, as described, a swinging piece that may be opened and shut and grasped in the act of discharging the pistol, the combination being substantially such as described.

2. The slotted chamber-piece U, constructed substantially as described.

3. In combination with a pistol-stock one part of which swings upon the other, the trigger and spring so combined together, as described, that the trigger protrudes when the stock is opened, and returns to its place after the discharge.

BENJ. T. LOOMIS.

Witnesses:
S. J. GORDON,
GEO. H. COLLINS.